Patented Dec. 7, 1948

2,455,631

UNITED STATES PATENT OFFICE 2,455,631

PROCESS FOR PRODUCING DIACETYL

Oliver J. Weinkauff, St. Louis, Mo., assignor to Monsanto Chemical Company, St. Louis, Mo., a corporation of Delaware No Drawing. Application June 30, 1945, Serial No. 602,689

4 Claims. (Cl. 260—596)

This invention relates to the preparation of diacetyl and more particularly to a novel process for preparing the compound.

The method generally employed in preparing diacetyl comprises reacting isoamyl nitrite with methyl ethyl ketone in the presence of hydrochloric acid and subsequently hydrolyzing the resulting diacetyl mono-oxime. The desired product is recovered in low yields from dilute aqueous solutions.

The present invention, generally stated, comprises gradually adding 2,3-butanediol to a suspension of copper chromite catalyst in mineral oil maintained at a temperature in the range of 250–300° C., and condensing the vapors evolved from the reaction mixture. The recovery of diacetyl from the reaction mixture may be accomplished by any desired procedure. For example, if the reaction vessel is equipped with a long fractionating column, a fraction consisting substantially of an azeotropic mixture of diacetyl and water may be obtained. In this instance, the intermediate reaction product, 3-keto-butanol-2, B. P. 150° C., is condensed in the column and returned to the reaction vessel for conversion into diacetyl. The diacetyl fraction may be further processed to obtain anhydrous diacetyl, for example, by salting out the diacetyl from the distillate with sodium chloride and subsequently fractionally distilling the non-aqueous layer.

In an alternative procedure for recovering diacetyl from the reaction mixture, the vapors from the reaction mixture may be condensed without fractionation and the mixture of diacetyl 3-keto-butanol-2 and water thus obtained may subsequently be fractionated to recover a fraction consisting of diacetyl and water and a fraction consisting of 3-keto-butanol-2. The latter fraction may then be charged into the reaction vessel for conversion to diacetyl. The diacetyl fraction may then be further processed to recover anhydrous diacetyl. The process may be operated either batchwise or as a continuous process.

As a further alternative procedure for recovering diacetyl from the reaction mixture, the vapors evolved from the reaction mixture may be partially condensed to recover diacetyl together with some 3-keto-butanol-2 and water. This condensate may then be further processed to obtain anhydrous diacetyl and the 3-keto-butanol-2 may be recovered and returned to the reaction vessel.

The reaction embodied in the process of the present invention is substantially quantitative. The recovery of substantially all of the diacetyl formed in the reaction depends largely on the efficiency of the recovery operations. The process requires fewer operations and less equipment than in the case of processes employed heretofore.

Mineral oils suitable for the suspension of the catalyst in the process of the present invention are those which are substantially inert in the presence of the catalyst and reactants under the conditions of the reaction. The mineral oil selected may have a boiling range of 250–300° C. or below this range or above this range. In place of mineral oil, any organic solvent which is substantially inert in the presence of the catalyst and reactants under the conditions of the reaction may be employed. An inert organic solvent which has a boiling point in the range of 250–300° C. may be employed. The vapors of the solvent can be condensed in a fractionating column and returned to the reaction mixture without contaminating the diacetyl fraction recovered. Likewise, an inert organic solvent having a boiling range above 300° C. may be employed. Illustrative of inert organic solvents suitable for the purpose of the present invention are diphenyl, diphenyl methane, diphenyl ethane, 2,4'-ditolyl, diphenyl ether, dicyclohexyl and cocoanut oil. Efforts to prepare diacetyl by passing 2,3-butanediol vapors over a copper chromite catalyst supported on a silica carrier and in the absence of a liquid suspension medium such as mineral oil at a temperature of 250–300° C. resulted in the formation of only a minute trace of diacetyl and the chief reaction product was found to be an unsaturated hydrocarbon. The starting material, 2,3-butanediol, boils at 184° C. Since the reaction temperature for conversion of the diol to diacetyl was found to be 250–300° C., it was found necessary to add the diol slowly to the catalyst maintained at the reaction temperature. A desirable range for the reaction temperature was found to be 270–290° C.

The invention is illustrated by the following example, without being limited thereto:

The copper chromite catalyst employed may be prepared as described in the literature, for example, by Calingaert and Edgar in the Journal of Industrial and Engineering Chemistry, vol. 26, pages 878–9, 1934. Eight grams of a copper chromite catalyst prepared in this manner were suspended in 100 cc. of a white mineral oil having a boiling range of approximately 338–400° C., a specific gravity at 60° F. of 0.835–0.845 and a Saybolt viscosity at 100° F. of 65/75. The resulting suspension was heated with agitation to 250° C. To this agitated and heated suspension of catalyst was added slowly 38.6 g. of 2,3-butanediol. During the addition of the diol, the temperature of the reaction mixture was raised to within the range of 270-290° C. and was maintained within that range. As the diol was added, vapors were taken off in a fractionating column connected with the reaction vessel over a temperature range of 88-91° C. These vapors were condensed and a yellowish liquid was obtained. The condensate separated in two layers, the upper layer consisting of 95% diacetyl and 5% water, and the lower layer consisting of a mixture of 30% diacetyl and 70% water. The upper layer was further fractionated, taking off the vapors at the vapor temperature of the azeotrope, continuously condensing these vapors and returning the upper layer of the condensate to the still until the final condensate was substantially free from water. Simultaneously, the lower aqueous layer of the condensate was continuously removed to a stripping still for further concentration of the diacetyl content. The concentrate from the stripping still was then returned to the fractionating apparatus for recovery of concentrated diacetyl. Any desired method of recovering anhydrous diacetyl from the product recovered from the reaction mixture may be employed. The reaction was found to be quantitative and the yields were excellent.

I claim:

1. A process for preparing diacetyl comprising slowly adding 2,3-butanediol to a copper chromite catalyst suspended in a mineral oil and maintained at a temperature in the range of 250-300° C. and recovering diacetyl from the vapors evolved, said mineral oil being substantially inert in the presence of the catalyst and reactants under the reaction conditions.

2. A process for preparing diacetyl comprising slowly adding 2,3-butanediol to a copper chromite catalyst suspended in a mineral oil and maintained at a temperature in the range of 250-300° C., condensing the vapors which are evolved and recovering diacetyl from the condensate, said mineral oil being substantially inert in the presence of the catalyst and reactants under the reaction conditions.

3. A process for preparing diacetyl comprising slowly adding 2,3-butanediol to a suspension of copper chromite catalyst in a liquid medium maintained at a temperature in the range of 250-300° C. and recovering diacetyl from the vapors evolved, said liquid medium consisting of an organic substance having the liquid form at temperatures in the range of 250-300° C., having a boiling point above approximately 250° C. and being substantially inert in the presence of the catalyst and reactants under the reaction conditions.

4. A process for preparing diacetyl comprising slowly adding 2,3-butanediol to a suspension of copper chromite catalyst in a liquid medium maintained at a temperature in the range of 250-300° C., condensing the vapors which are evolved and recovering diacetyl from the condensate, said liquid medium consisting of an organic substance having the liquid form at temperatures in the range of 250-300° C., having a boiling point above approximately 250° C. and being substantially inert in the presence of the catalyst and reactants under the reaction conditions.

OLIVER J. WEINKAUFF.

REFERENCES CITED

The following references are of record in the file of this patent:

UNITED STATES PATENTS

| Number | Name | Date |
|---|---|---|
| 1,895,516 | Lazier | Jan. 31, 1933 |
| 1,978,824 | Swallen | Oct. 30, 1934 |
| 2,051,266 | McAllister | Aug. 18, 1936 |